(12) United States Patent
Kokes

(10) Patent No.: US 9,676,438 B2
(45) Date of Patent: Jun. 13, 2017

(54) MOTORCYCLE TO REVERSE TRIKE CONVERSION KIT AND METHOD

(71) Applicant: IDO-Endeavor LLC, New Prague, MN (US)

(72) Inventor: Norm Kokes, New Prague, MN (US)

(73) Assignee: IDO-Endeavor Inc., New Prague, MN (US)

( * ) Notice: Subject to any disclaimer, the term of this patent is extended or adjusted under 35 U.S.C. 154(b) by 0 days.

(21) Appl. No.: 14/771,432

(22) PCT Filed: Oct. 23, 2014

(86) PCT No.: PCT/US2014/062071
§ 371 (c)(1),
(2) Date: Aug. 28, 2015

(87) PCT Pub. No.: WO2015/122940
PCT Pub. Date: Aug. 20, 2015

(65) Prior Publication Data
US 2016/0023709 A1    Jan. 28, 2016

Related U.S. Application Data

(60) Provisional application No. 61/938,394, filed on Feb. 11, 2014.

(51) Int. Cl.
*B62K 13/04*      (2006.01)
*B62K 13/00*      (2006.01)

(52) U.S. Cl.
CPC ............. *B62K 13/04* (2013.01); *B62K 13/00* (2013.01)

(58) Field of Classification Search
CPC ................................ B62K 13/00; B62K 13/04
See application file for complete search history.

(56) References Cited

U.S. PATENT DOCUMENTS

| | | | | |
|---|---|---|---|---|
| 3,610,358 A | * | 10/1971 | Korff | B62D 61/065 180/11 |
| 4,088,199 A | * | 5/1978 | Trautwein | B60G 21/007 180/209 |
| 4,158,397 A | * | 6/1979 | Reynolds | B62D 21/08 180/11 |
| 4,506,753 A | * | 3/1985 | Wood, Jr. | B62D 61/065 180/210 |
| 5,236,060 A | * | 8/1993 | Huber | B62D 61/065 180/210 |

(Continued)

*Primary Examiner* — Kevin Hurley
*Assistant Examiner* — Michael Stabley
(74) *Attorney, Agent, or Firm* — Thomas J. Oppold; Larkin Hoffman Daly & Lindgre, Ltd.

(57) ABSTRACT

A method and kit for converting a two-wheeled motorcycle into a three-wheeled reverse trike. To convert the two wheeled motorcycle to a reverse trike, the front fork tubes, including the front wheel, are removed from the triple-tree of the motorcycle. A frame assembly mounts to a forward end of the motorcycle. Left and right wheels are mounted to the frame assembly with wheel suspension systems. A steering shaft is attached to the triple-tree of the motorcycle. Steering tie rods are linked to the steering shaft and the wheel spindles, whereby turning of the handle bars causes the steering shaft to rotate about its longitudinal axis and causes the left and right steering tie rods to effect corresponding turning of the left and right front wheels.

22 Claims, 11 Drawing Sheets

(56) References Cited

U.S. PATENT DOCUMENTS

| | | | | |
|---|---|---|---|---|
| 5,967,538 A * | 10/1999 | Callaluca | ............... | B62K 21/00 |
| | | | | 180/219 |
| 7,591,337 B2 * | 9/2009 | Suhre | ....................... | B60G 3/20 |
| | | | | 180/210 |
| 9,387,902 B2 * | 7/2016 | Kroening, Jr. | ......... | B62K 13/04 |
| 2004/0035626 A1 * | 2/2004 | Girouard | ................... | B62J 1/12 |
| | | | | 180/210 |
| 2015/0197304 A1 * | 7/2015 | Kroening, Jr. | ......... | B62K 13/04 |
| | | | | 180/209 |

\* cited by examiner

MOTORCYCLE TO REVERSE TRIKE CONVERSION KIT AND METHOD

CROSS-REFERENCE TO RELATED APPLICATIONS

This application claims the benefit of U.S. Provisional Application No. 61/938,394, filed Feb. 11, 2014, the entire disclosures of which are incorporated herein by reference.

BACKGROUND

Three-wheeled motorcycles or "trikes" having two rear wheels and a single front wheel are well known in the art. Trikes combine many of the best features of a traditional motorcycle with those of a four-wheeled vehicle in a way that produces highly advantageous results. First, the overall size of the reverse-trike makes it more visible than a conventional motorcycle, thus increasing rider safety. Second, the extra third wheel offers stability by making it easier to balance, drive, and steer. Third, it has more storage and cargo space than a traditional motorcycle. Finally, it is simply fun to drive and often results in admiring stares and questions from others. While trikes are fairly prevalent, they are usually custom made and therefore they are typically much more expensive than conventional two-wheeled motorcycles.

A variation of the traditional trike motorcycle has recently been introduced which is referred to in the industry as a "reverse-trike" in that it has two front wheels and one rear wheel. Reverse trikes are visually striking and offer the benefits of the traditional trike. In addition, reverse trikes handle more like a conventional two-wheeled motorcycle and therefore many riders prefer reverse-trikes over the traditional trikes. Reverse trikes, like traditional trikes are usually custom made, but recently some original equipment manufacturers (OEM's) have started producing reverse trikes.

Whether custom made or produced by an OEM, reverse-trikes are considerably more expensive than conventional motorcycles. The cost was often so high that consumers were forced to choose a conventional two-wheeled motorcycle over the more-desired but more expensive reverse-trike. Accordingly, there is a need for a relatively low cost means to convert a conventional two-wheeled motorcycle into a three-wheeled reverse-trike.

DESCRIPTION

Figure 1:
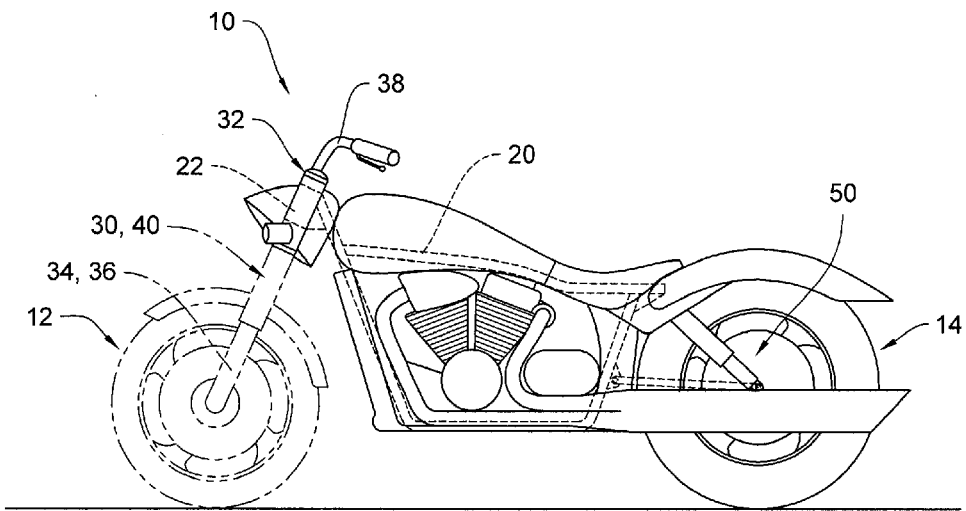
FIG. 1 is a side elevation view of a conventional motorcycle.
Figure 2:
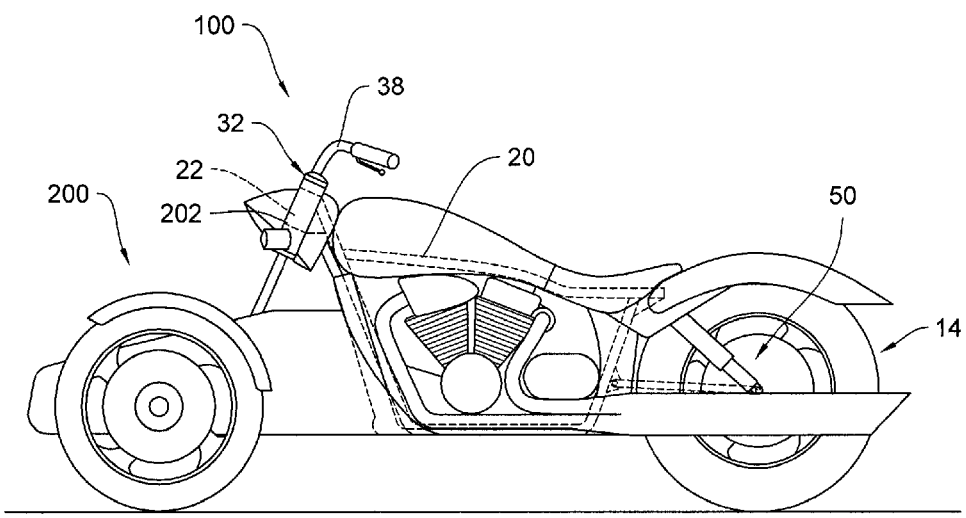
FIG. 2 is a side elevation view of the conventional motorcycle of FIG. 1 converted to a reverse trike using one embodiment of a conversion kit.

Referring now to the drawings wherein like reference numerals designate the same or like parts throughout the several views, FIG. 1 illustrates a conventional two-wheeled motorcycle 10 having a single front wheel 12 and a single rear wheel 14. FIG. 2 shows the motorcycle 10 with a conversion kit 200 resulting in a reverse trike 100 with two front wheels. Obviously, there are various makes and models of motorcycles, so the particular style or appearance of the motorcycle 10 shown in FIG. 1 is intended to be representative only. Likewise, it should be appreciated that the conversion kit 200 may comprise different configurations, so the particular configuration of the conversion kit illustrated in the drawings is intended to be representative only.

Referring to FIG. 1, the conventional two-wheeled motorcycle 10 includes a front wheel 12, a rear wheel 14 and a chassis which is comprised of a main frame 20, a front fork 30, a front suspension system 40 and a rear suspension system 50. The main frame 20 of the motorcycle 10 is typically comprised of welded aluminum, steel or alloy struts configured for the particular style of the motorcycle and to accommodate the engine and the transmission. A head tube 22 is welded to the forwardly extending struts of the main frame 20. The head tube 22 pivotally supports the triple tree 32 of the front fork 30. Two parallel fork tubes 34, 36 are attached to the triple tree 32 and extend downwardly and forwardly, holding the axle of the front wheel 12 therebetween. The handlebars 38 are, in turn, connect to the triple tree 32.

Comparing FIGS. 1 and 2, and as explained in more detail below, it should be appreciated that, essentially, the only difference between the conventional two-wheeled motorcycle 10 and the converted three-wheeled reverse trike 100 is the front end of the motorcycle 10 below the triple tree 32 (shown in phantom lines in FIG. 1)—all other components of the motorcycle, including the engine, transmission, the rear wheel and drive system, the rear suspension system, exhaust system, clutch system, throttle system, brake system, lights, handlebars, and seat remain substantially untouched and unchanged in the conversion to the three-wheeled reverse trike 100. One of the few exceptions may be for motorcycles which utilize a radiator and liquid coolant system, which may require the radiator to be removed and repositioned to accommodate mounting of the adaptor cradle of the conversion kit 200 (discussed later).

The motorcycle 10 (and the resulting converted reverse trike 100) may have any type of transmission and drive system for transferring power from the transmission gear box to the rear wheel. Most motorcycles utilize a sequential manual transmission which is shifted by a fool lever and utilizing a clutch lever on the handle bars to engage and disengage the transmission. The power transfer or drive systems used in most motorcycles include chain drives, belt drives and shaft drives. Additionally, most motorcycles typically have an independent front wheel brake and a rear wheel brake, with the front brake typically actuated by a front brake lever on the handlebar and the rear brake typically actuated by a foot lever. As explained above, the transmission, power transfer, clutch system and the brake system remains substantially unchanged between the motorcycle 10 and the converted reverse trike 100, except that the front brake system of the reverse trike 100 is adapted to actuate the brakes on each of the two front wheels instead of the single front wheel 12 as explained in more detail later.

Figure 3:
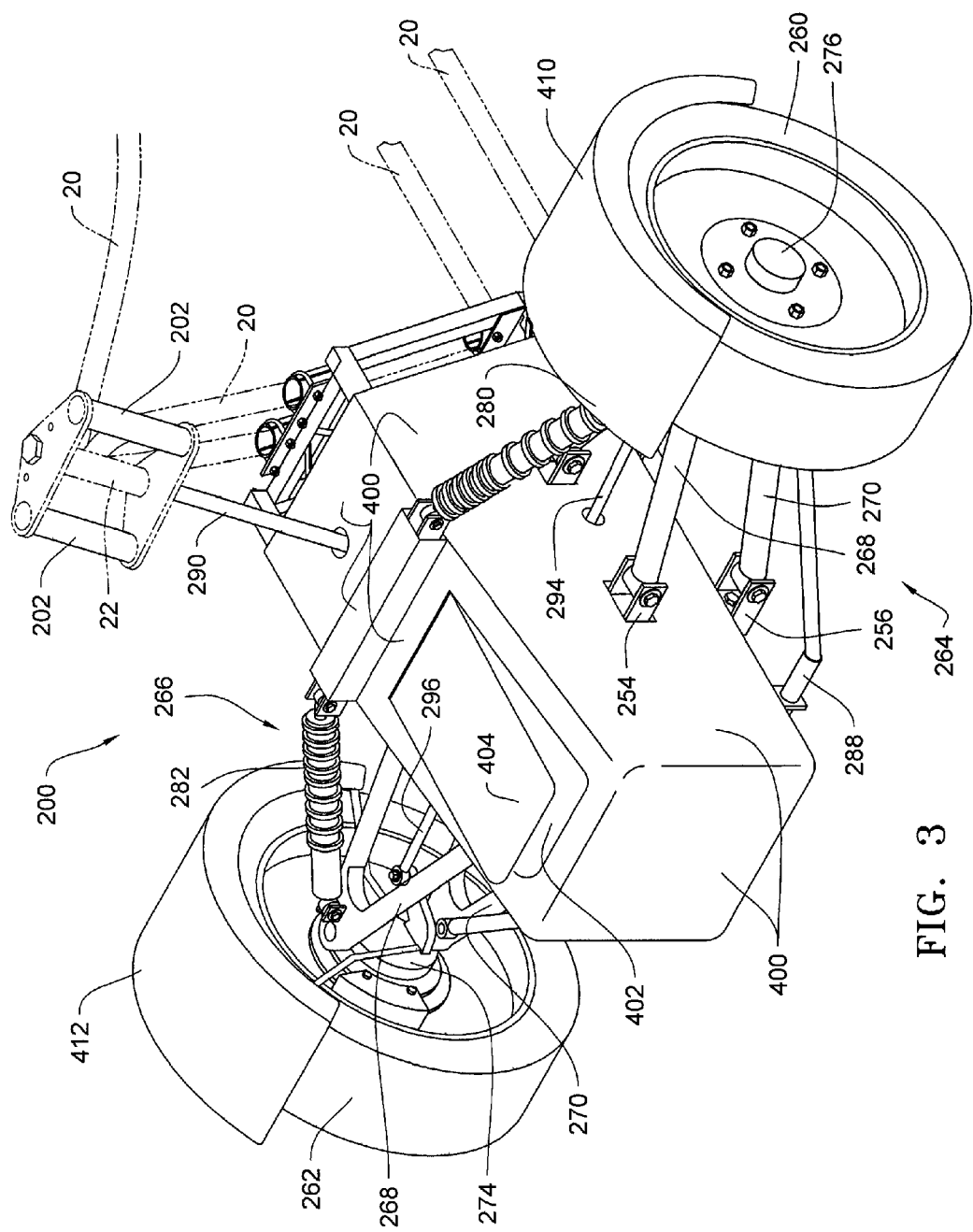
FIG. 3 is a perspective view of the conversion kit of FIG. 2.
Figure 4:
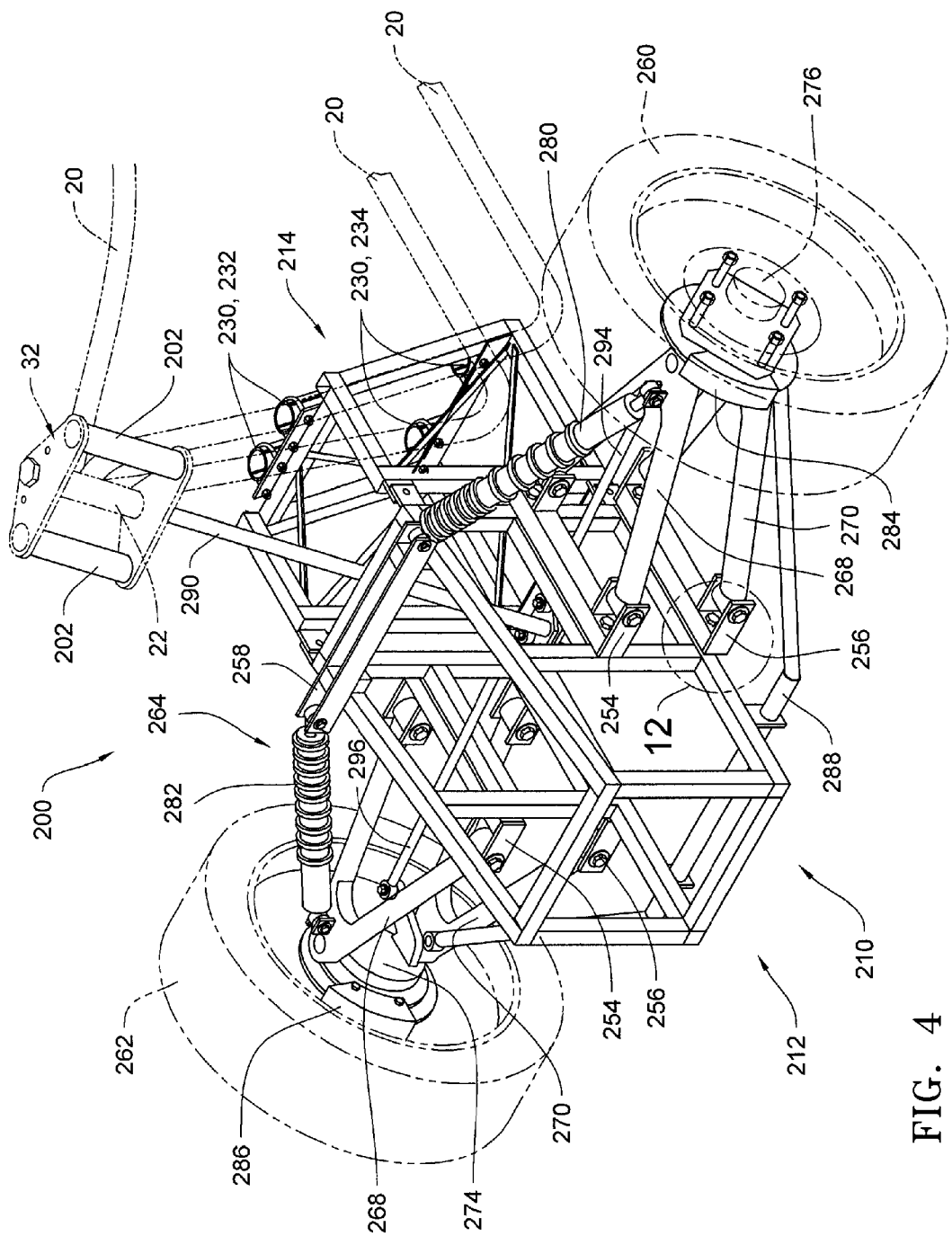
FIG. 4 is a perspective view of the conversion kit of FIG. 3 with the face panels removed to show an embodiment of the internal frame structure of the conversion kit.

FIG. 3 is a perspective view of an embodiment of the conversion kit 200 (shown in solid lines) mounted to the motorcycle frame 20 and triple tree 32, shown in phantom lines to more clearly differentiate those elements as being part of the original motorcycle 10. FIG. 4 is the same perspective view of the conversion kit shown in FIG. 3, but with the body panels removed to better illustrate an embodiment of the frame assembly 210 and other components of the conversion kit 200 discussed below. It should be appreciated that the frame assembly 210 may have any desired aesthetic configuration.

To convert the two-wheeled motorcycle to a three-wheeled reverse trike, the front fork tubes 34, 36, including the front wheel 12, are detached from the triple tree 32 (shown in phantom lines in FIG. 1). Referring to FIG. 3, it should be appreciated that when the front fork tubes 34, 36 are removed from the triple tree 32, the triple tree will have unused fork tube openings. Accordingly, for aesthetic purposes, a pair of short replacement tubes 202 may be secured into the openings of the triple tree 32 using the original clamping mechanisms for the front fork tubes 34, 36 (see FIG. 10). The short tubes 202 may have a similar diameter as the original fork tubes 34, 36 and may be made of similar materials for aesthetic purposes.

Figure 5:
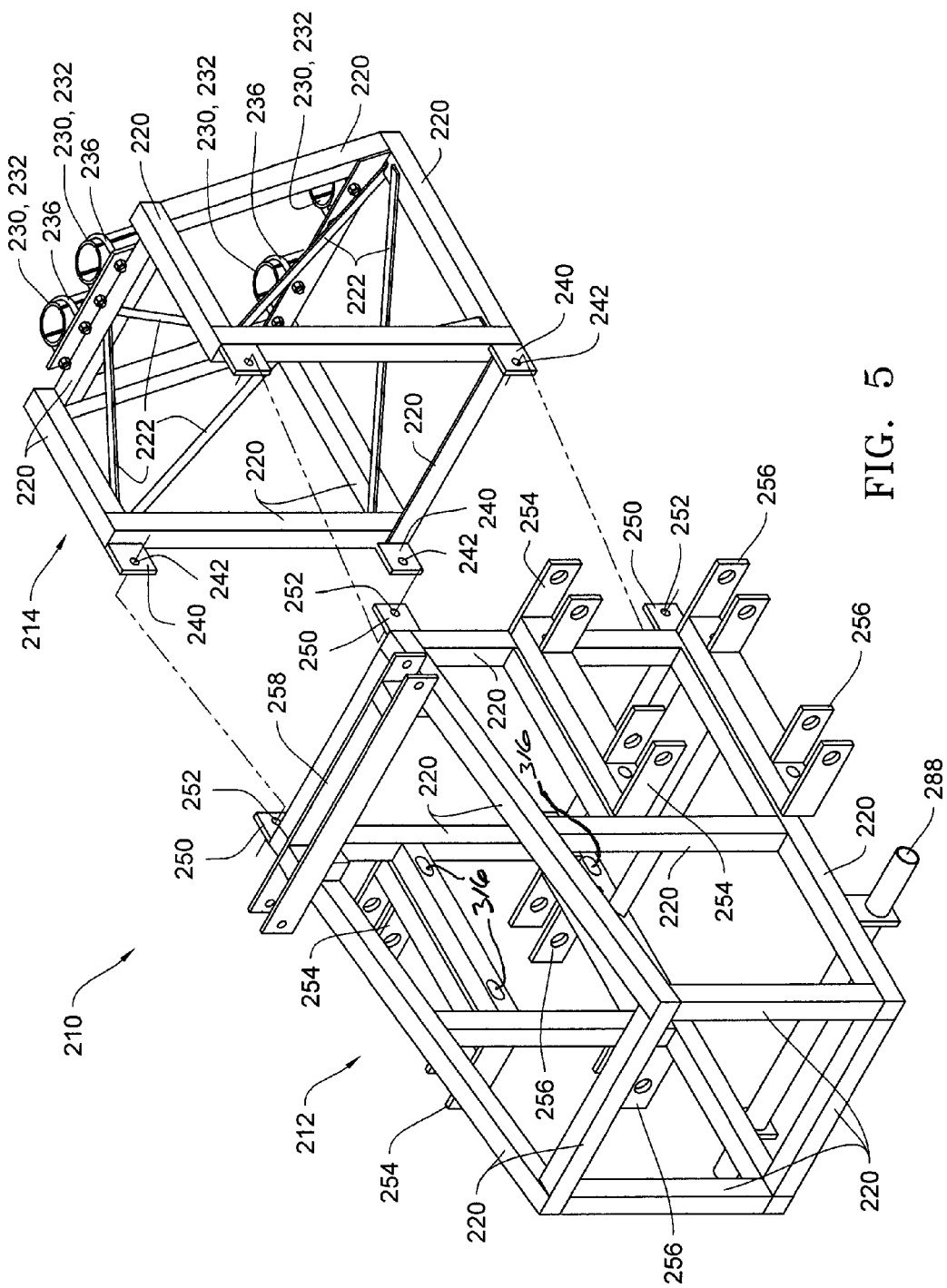
FIG. 5 is a perspective view of the frame structure of the conversion kit of FIG. 4.

Referring to FIGS. 4 and 5, the frame assembly 210 may be comprised of a forward frame assembly 212 and an adapter cradle 214. The forward frame assembly 212 is preferably a universal frame which may be used to convert virtually any motorcycle to a reverse trike, thereby enabling the forward frame assembly 212 to be mass produced to reduce the overall cost of the conversion kit 200. The adaptor cradle 214 is preferably standardized as much as possible so much of it too can be mass produced to reduce cost. However, because the adaptor cradle 214 is the component that mounts to the motorcycle, particular elements may need to be designed and arranged for adapting to the particular make and model of the motorcycle. These particular elements may be mass produced per make and model of motorcycle to reduce costs and then attached to the standardized adaptor cradle elements for the particular motorcycle being converted.

Both the forward frame assembly 212 and adaptor cradle 214 are preferably constructed of frame members 220 which are welded together to result in the desired frame shape. The frame members may be square, rectangular or round hollow tubular steel or aluminum members. Alternatively, angular or bar stock material may also be used for the frame members 220. Appropriate cross bracing 222 is added as needed to provide structural rigidity.

The rearward end of the adaptor cradle 214 includes motorcycle mounts 230 which secure to the frame 20 of the motorcycle or other secure mount locations. In the embodiment shown in FIGS. 3-5, the motorcycle mounts 230 are comprised of a pair of upper and lower saddle brackets 232, 234 sized and spaced to receive the tubular struts of the motorcycle frame 20 as best illustrated in FIG. 4. U-bolts 236 securely clamp the saddle brackets 216, 218 to the motorcycle frame 20. The saddle brackets 232, 234 may be lined with rubber or other suitable padding material to minimize abrasion of the paint on the motorcycle frame and minimize vibration between metal-on-metal parts. It should be appreciated that the rearward end of the adaptor cradle 214 shown in FIGS. 3-5 is sloped to match the slope of the motorcycle frame 20.

Figure 6:
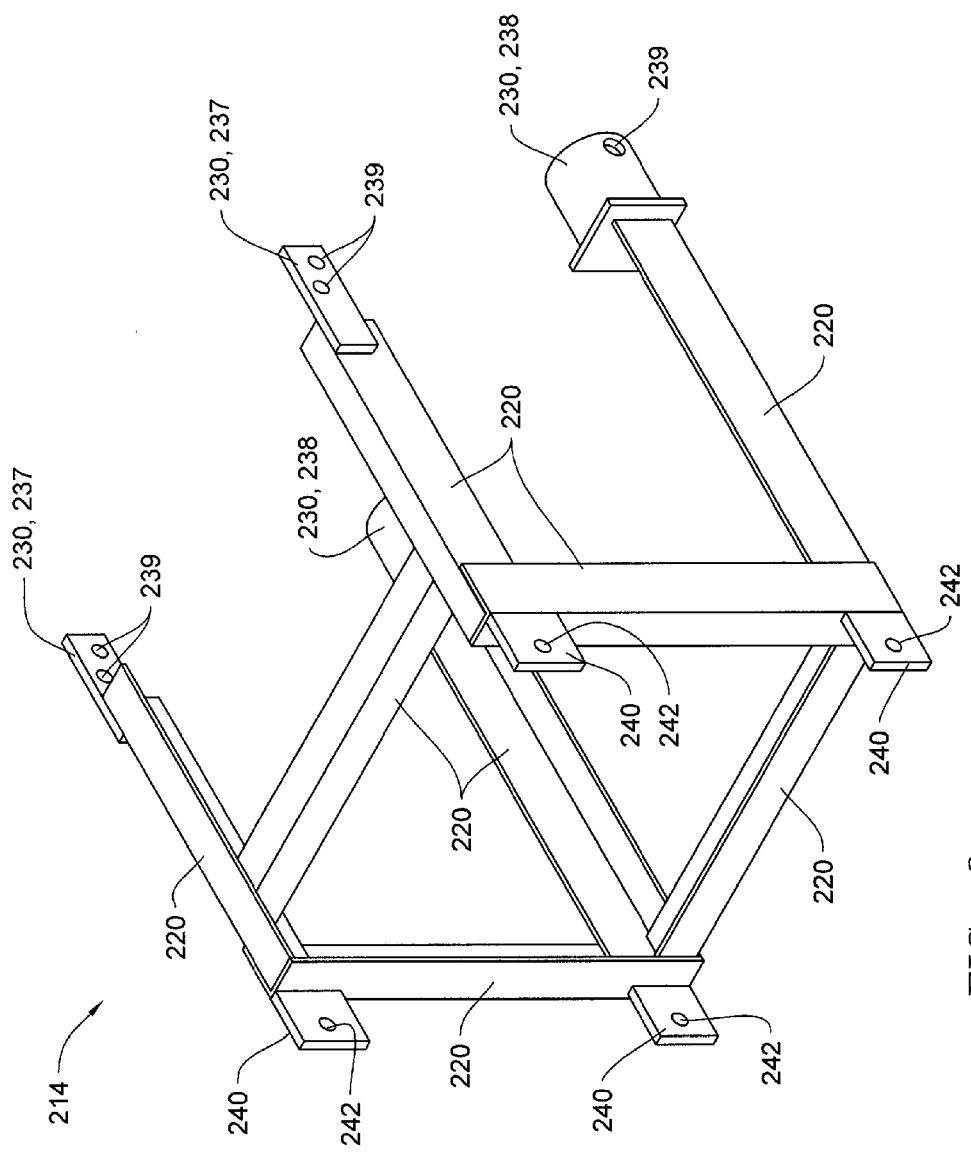
FIG. 6 is a perspective view of another embodiment of an adaptor cradle.
Figure 7:
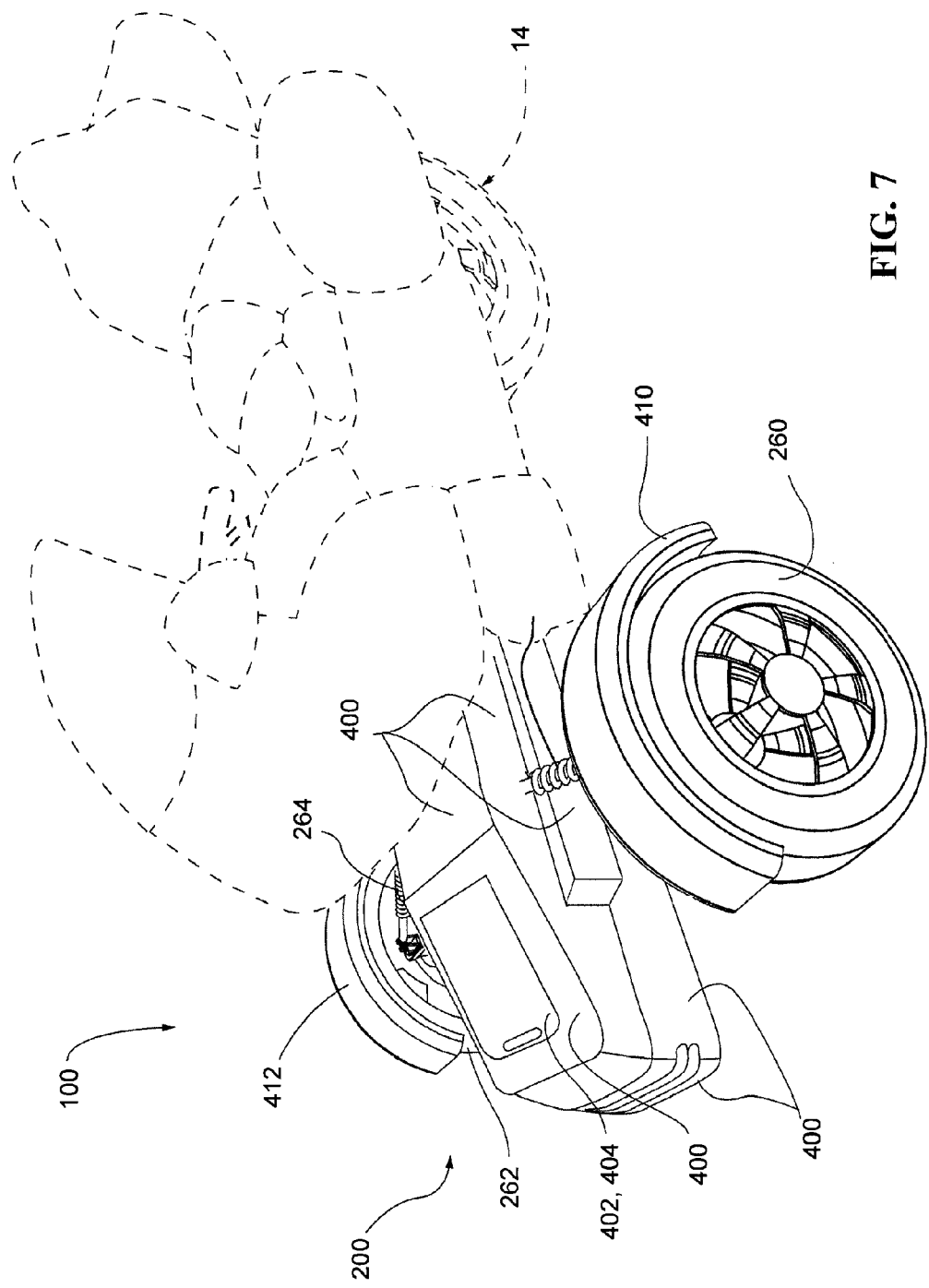
FIG. 7 is a perspective view of another conventional motorcycle converted to a reverse trike using another embodiment of a conversion kit.

FIG. 6 illustrates another embodiment of an adaptor cradle 214. In this embodiment, rather than using saddle brackets, the upper motorcycle mounts 230 are shown as plate brackets 237 and the lower motorcycle mounts 230 are shown as tube brackets 238 which mount to the motorcycle frame 20 or other suitable mounting location with a bolted connection (not shown) extending through apertures 239 in the brackets 237, 238. Again, the rearwardly extending frame members 220 may extend at different lengths to match the slope of the motorcycle frame 20. Although only a few specific representative examples of the motorcycle mounts 230 are disclosed herein, it should be appreciated that the motorcycle mounts may be any type of structure, shape or configuration suitable for securely mounting the adaptor cradle to the motorcycle frame or other secure mounting location on the motorcycle.

The forward end of the adaptor cradle includes mounting ears 240 with apertures 242 which align with mating mounting ears 250 and apertures 252 at the rearward end of the forward frame assembly 212. The mounting ears 240, 250 are secured together with nuts and bolts (not shown) extending through the aligned apertures 242, 252. The frame assembly 210 further includes upper and lower control arm mounting brackets 254, 256 and shock mounting brackets 258 for the left and right front wheels 260, 262.

The left and right front wheels 260, 262 are mounted to the frame assembly 210 by left and right wheel suspension systems 264, 266, respectively. Each of the left and right wheel suspension systems 264, 266 comprise upper and lower control arms or A-arms 268, 270 which are pivotally secured by bolted connections to the upper and lower control arm mounting brackets 254, 256. The outer ends of the respective A-arms 268, 270 are attached to the left and right wheel spindles 272, 274 each of which respectively rotatably supports the left and right wheel hubs 276, 278. The left and right wheel suspension systems further include left and right shocks 280, 282 which are mounted at one end to the shock mounting bracket 258 and at their other end to the wheel spindles 272, 274.

The left and right wheels 260, 262 also include a disc brake assembly 284, 286 supported by the respective left and right wheel hubs 276, 278. Brake lines (not shown) are connected to the front brake line reservoir of the front brake lever on the handlebar 38 of the motorcycle.

The suspension system for the front wheels may also incorporate an anti-sway bar 288 which is linked to the left and right wheel spindles 272, 274 and supported by the frame assembly 210.

Figure 10:
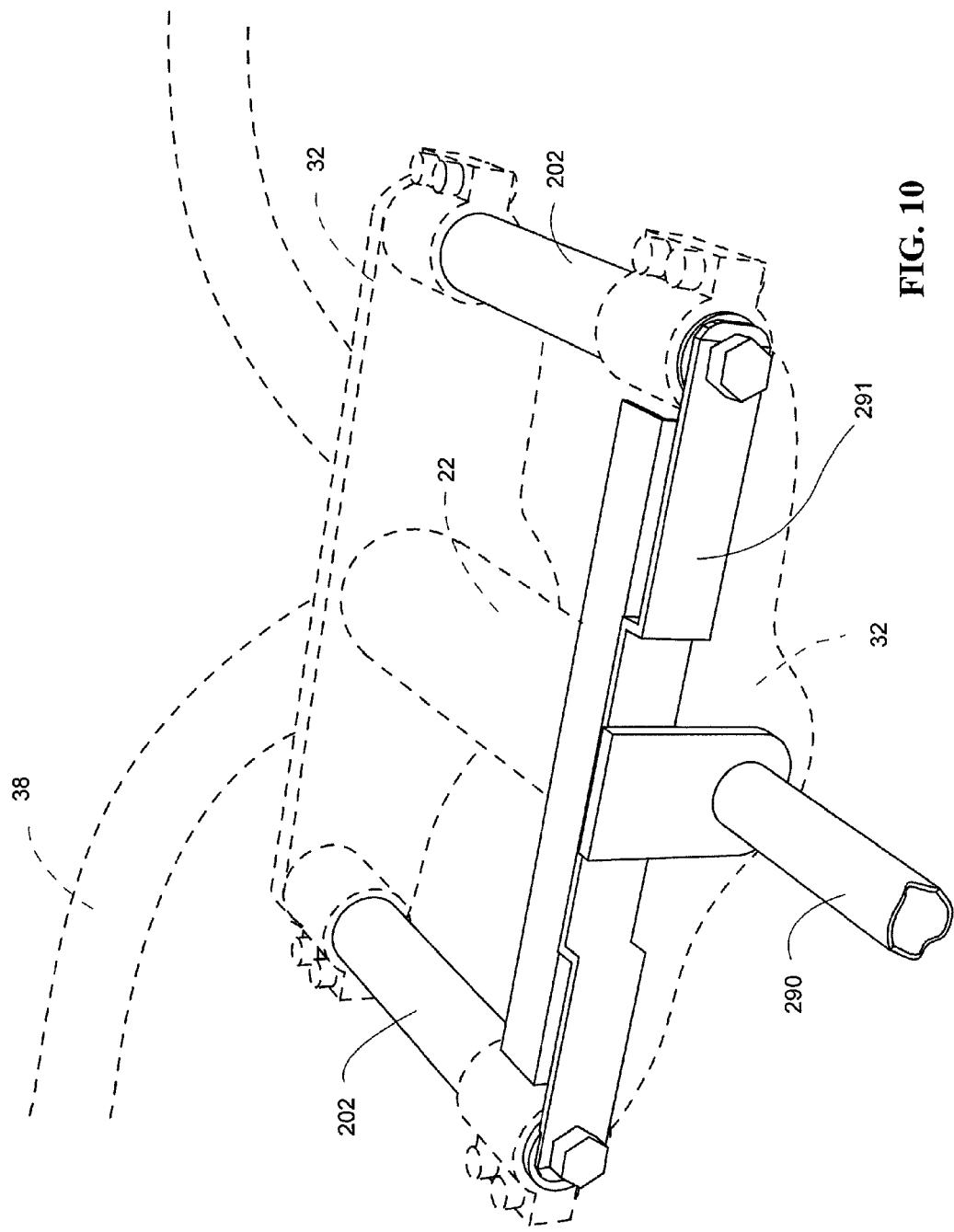
FIG. 10 is a perspective view of the triple-tree and steering shaft connection as viewed in the direction of lines 10-10 of FIG. 9.
Figure 11:
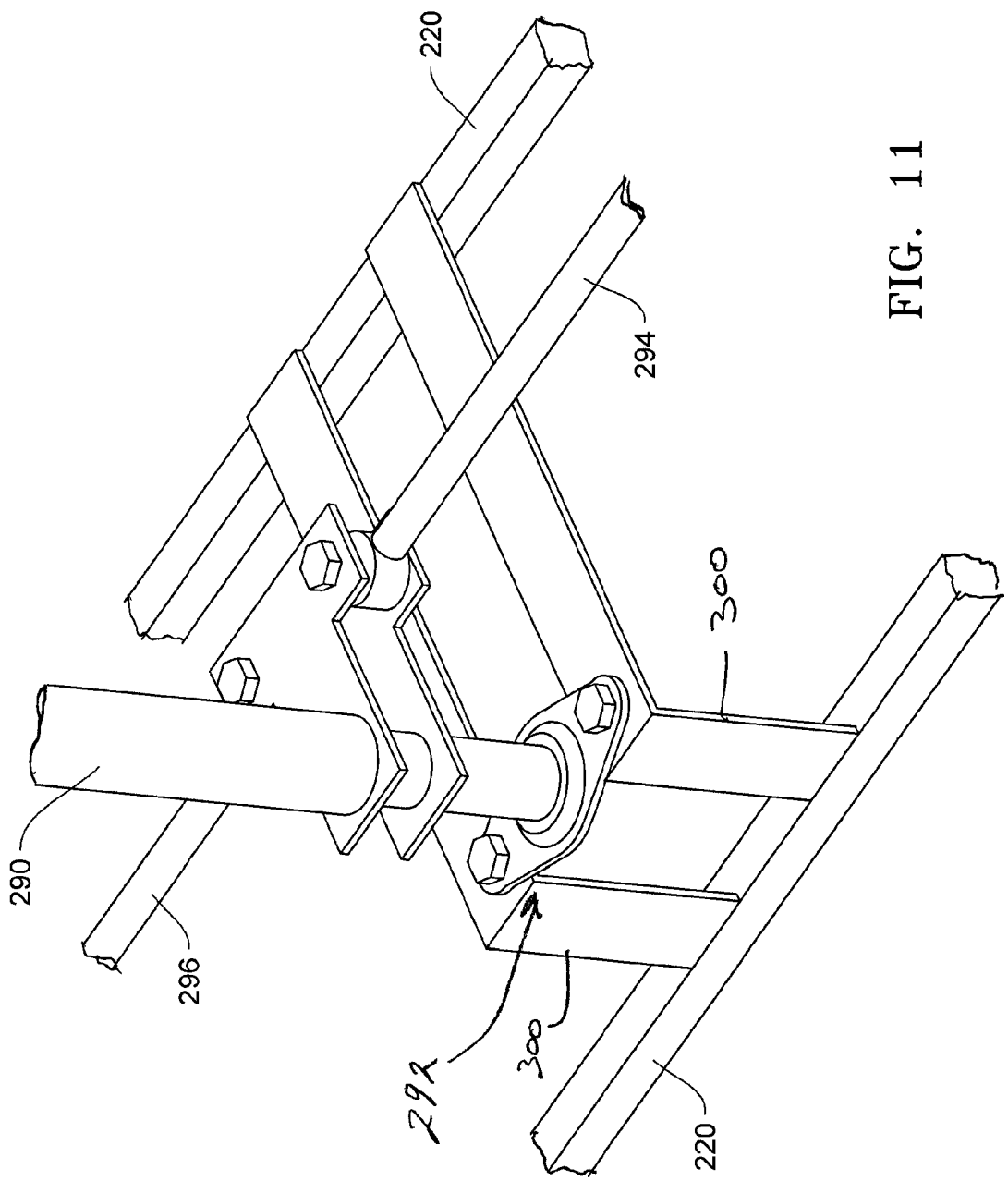
FIG. 11 is an enlarge perspective view of an embodiment of a lower bearing for the steering shaft.

For steering, a steering shaft 290 is rigidly secured at its upper end to the triple tree 32 using a steering shaft bracket 291 (See FIG. 10). As illustrated in FIG. 11, the steering shaft 290 is rotatably mounted at its lower end within the forward frame assembly 212 using a steering shaft bearing assembly 292. The steering shaft bearing assembly 292 may be supported within the frame assembly 212 by any suitably configured brackets 300 secured to the lateral frame members 220. Left and right steering tie rods 294, 296 are connected at one end by a linkage to the steering shaft 290 and are connected at their other ends by a linkage to a turning arm on the respective left and right wheel spindles 272, 274. Thus, it should be appreciated that because the handle bars 38 and the steering shaft 290 are rigidly secured to the triple-tree 32, when the handle bars 38 are turned, the steering shaft 290 will rotate about its longitudinal axis. The rotation of the steering shaft 290 causes the left and right steering tie rods 294, 296 linked thereto to exert a pushing force and a pulling force on the respective left and right wheel spindles 272, 274 forcing the left and right wheels 260, 262 to pivot or turn together in the direction in which the handle bars 38 are turned.

The frame 210 is covered by body panels 400 which may be fabricated from plastic, metal, fiberglass or any other suitable material and provided in colors and patterns which match the motorcycle 10. The body panels 400 are preferably mounted to the frame members 220 of the frame 210 which allows for multiple and variable styles, such that the end user may change the look of his or her reverse trike 100 by simply changing the body panels. The box type forward frame assembly 212 allows for a front storage compartment 402 which may be accessed through a door 404 in the top body panel. The door 404 preferably includes a latch mechanism which is preferably lockable for security. Each of the wheels also includes a fender 410, 412 which may mount to the respective wheel spindles 272, 274.

Figure 8:
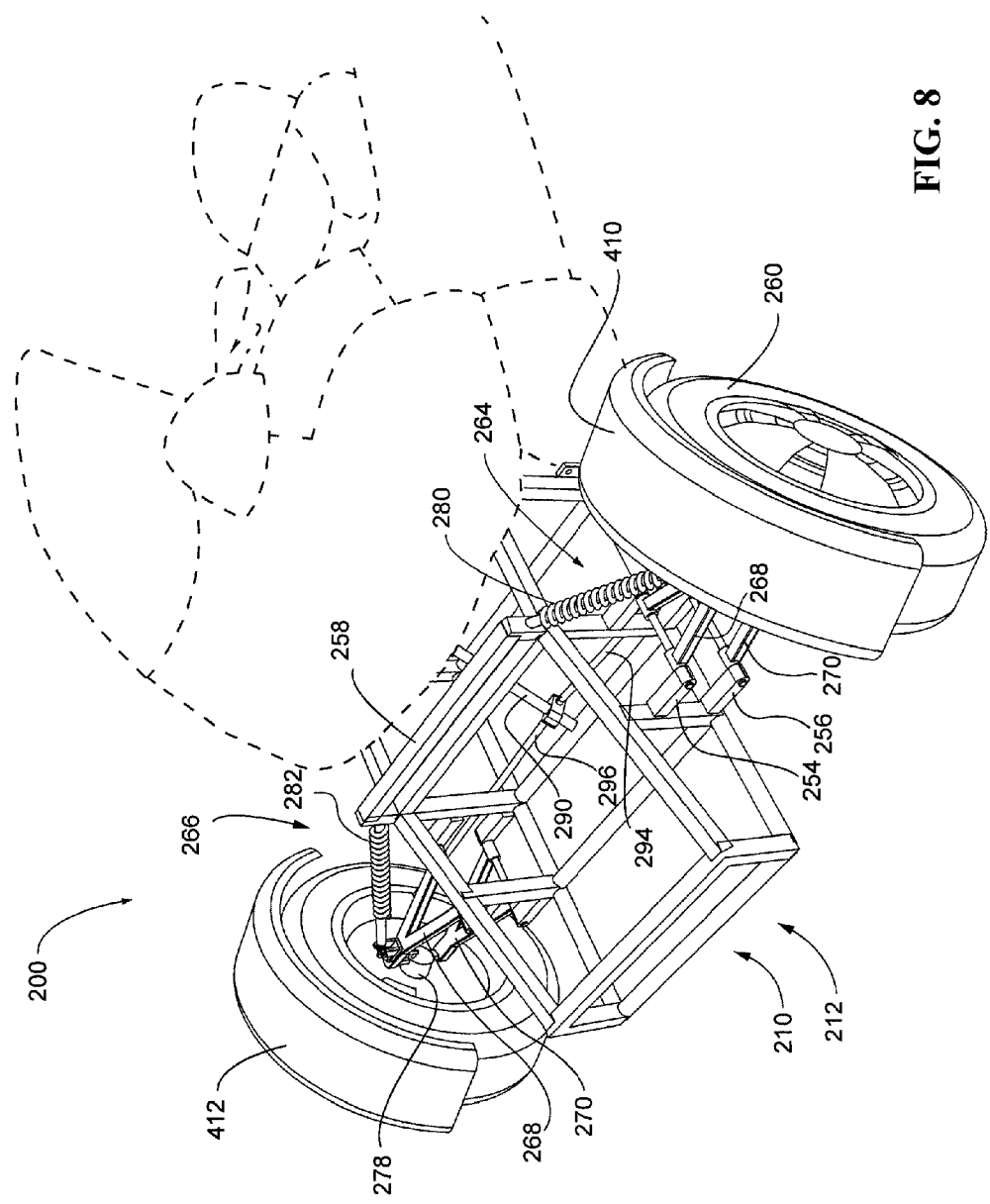
FIG. 8 is a perspective view of an embodiment of the frame structure of the conversion kit of FIG. 7.
Figure 9:
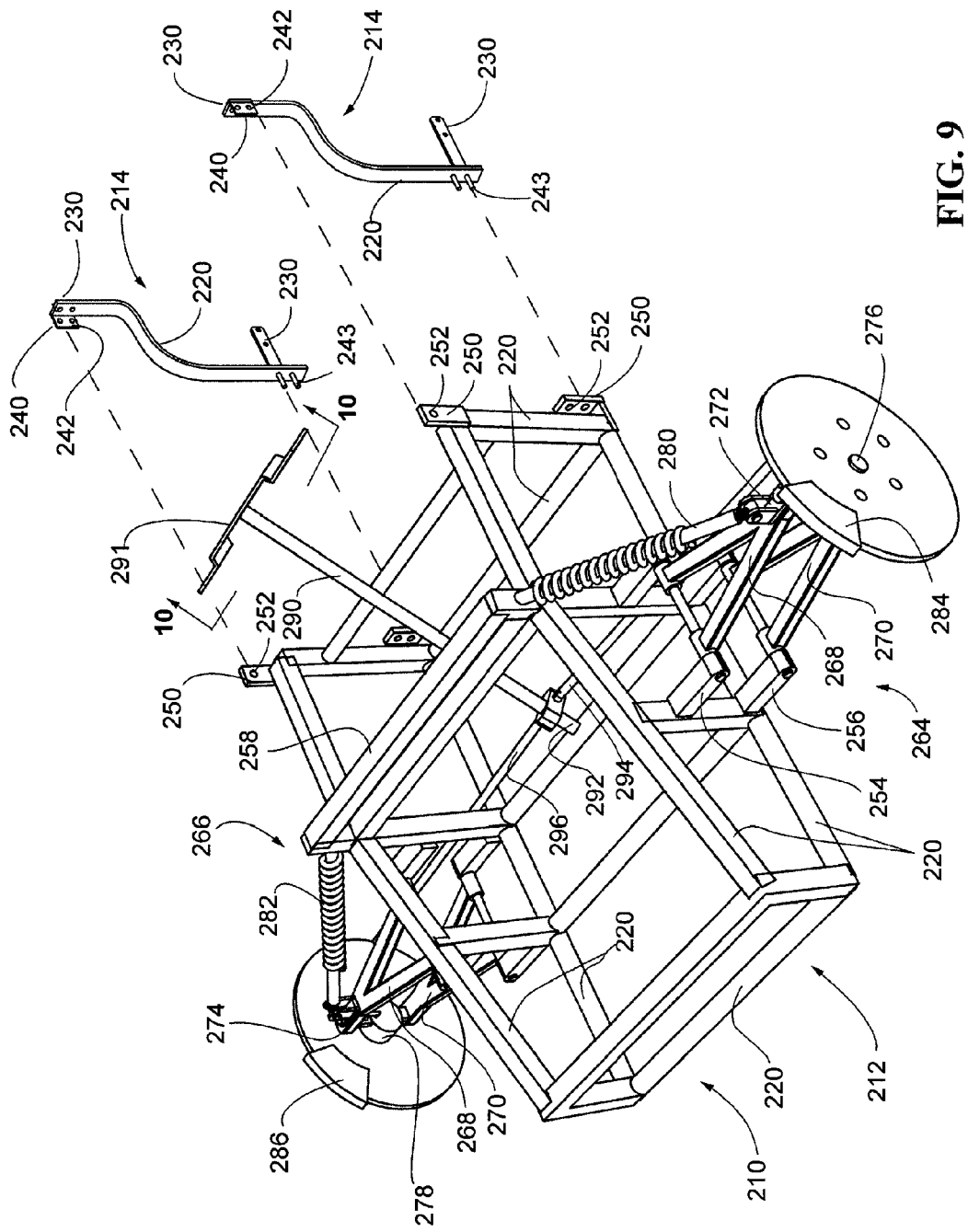
FIG. 9 is another perspective view of the frame structure of the conversion kit of FIG. 7 showing another embodiment of the adaptor cradle.

FIGS. 7-10 illustrates yet another embodiment of a reverse trike 100 converted from a conventional two-wheeled motorcycle using another embodiment of a conversion kit 200. Referring to FIGS. 8 and 9, in this embodiment, the frame assembly 210 of the conversion kit 200, includes a forward frame assembly 212 with substantially the same components as identified by corresponding reference numerals as referenced and described in connection with the previous embodiment of FIGS. 3-5. However, as best illustrated in FIG. 9, in this embodiment the adaptor cradle 214 comprising the frame assembly 210 is comprised of bent plate brackets 216 configured to mate with and mount to the frame 20 of the motorcycle or other suitable secure mounting locations using motorcycle mounts 230. As in the previous embodiment, the upper adaptor cradle 214 includes upper mounting ears 240 with apertures 242 which align with mating apertures 252 in the mounting ears 250 of the forward frame assembly 212. However, in this embodiment, at the lower end of the adaptor cradle, forwardly projecting threaded studs 243 are mounted to the forward end of the adaptor cradle 214 for mating alignment with apertures 252 in the lower mounting ears 250 of the forward frame assembly 212.

As in the previous embodiment, the left and right front wheels 260, 262 are mounted to the frame assembly 210 by left and right wheel suspension systems 264, 266, respectively. Each of the left and right wheel suspension systems 264, 266 comprise upper and lower control arms or A-arms 268, 270 which are pivotally secured by bolted connections to the upper and lower control arm mounting brackets 254, 256. The outer ends of the respective A-arms 268, 270 are attached to the left and right wheel spindles 272, 274 each of which respectively rotatably supports the left and right wheel hubs 276, 278. The left and right wheel suspension systems further include left and right shocks 280, 282 which are mounted at one end to the shock mounting bracket 258 and at their other end to the wheel spindles 272, 274.

The left and right wheels 260, 262 also include a disc brake assembly 284, 286 supported by the respective left and right wheel hubs 276, 278. Brake lines (not shown) are connected to the front brake line reservoir of the front brake lever on the handlebar 38 of the motorcycle.

The suspension system for the front wheels may also incorporate an anti-sway bar 288 (not shown in this embodiment) which may be linked to the left and right wheel spindles 272, 274 and supported by the frame assembly 210.

Referring to FIG. 10, as in the previous embodiment, a steering shaft 290 is rigidly secured at its upper end to the triple tree 32 with an upper steering shaft bracket 291. FIG. 10 also illustrates the short replacement tubes 202 secured into the openings of the triple tree 32 (after removal of the front fork tubes 34, 36) using the original clamping mechanisms for the front fork tubes 34, 36.

Also as in the previous embodiment, the lower end of the steering shaft 290 is rotatably mounted to a lower steering shaft bearing assembly 292 (FIG. 11) secured within the forward frame assembly 212. The steering shaft bearing assembly 292 may be supported within the frame assembly 212 by any suitably configured brackets 300 secured to the lateral frame members 220. Left and right steering tie rods 294, 296 are connected at one end by a linkage to the steering shaft 290 and are connected at their other ends by a linkage to the respective left and right wheel spindles 272, 274. Thus, it should be appreciated that because the handle bars 38 and the steering shaft 290 are rigidly secured to the triple-tree 32, when the handle bars 38 are turned, the steering shaft 290 will rotate about its longitudinal axis. The rotation of the steering shaft 290 causes the left and right steering tie rods 294, 296 linked thereto to exert a pushing force and a pulling force on the respective left and right wheel spindles 272, 274 forcing the left and right wheels 260, 262 to pivot or turn together in the direction in which the handle bars 38 were turned.

Also as in the previous embodiment, the frame 210 is covered by body panels 400 which may be fabricated from plastic, metal, fiberglass or any other suitable material and provided in colors and patterns which match the motorcycle 10. The body panels 400 are preferably mounted to the frame members 220 of the frame 210 which allows for multiple and variable styles, such that the end user may change the look of his or her reverse trike 100 by simply changing the body panels. The box type forward frame assembly 212 allows for a front storage compartment 402 which may be accessed through a door 404 in the top body panel. The door preferably includes a latch mechanism which is preferably lockable for security. Each of the wheels also includes a fender 410, 412 which mount by suitable brackets to the wheel spindles 272, 274.

Figure 12:
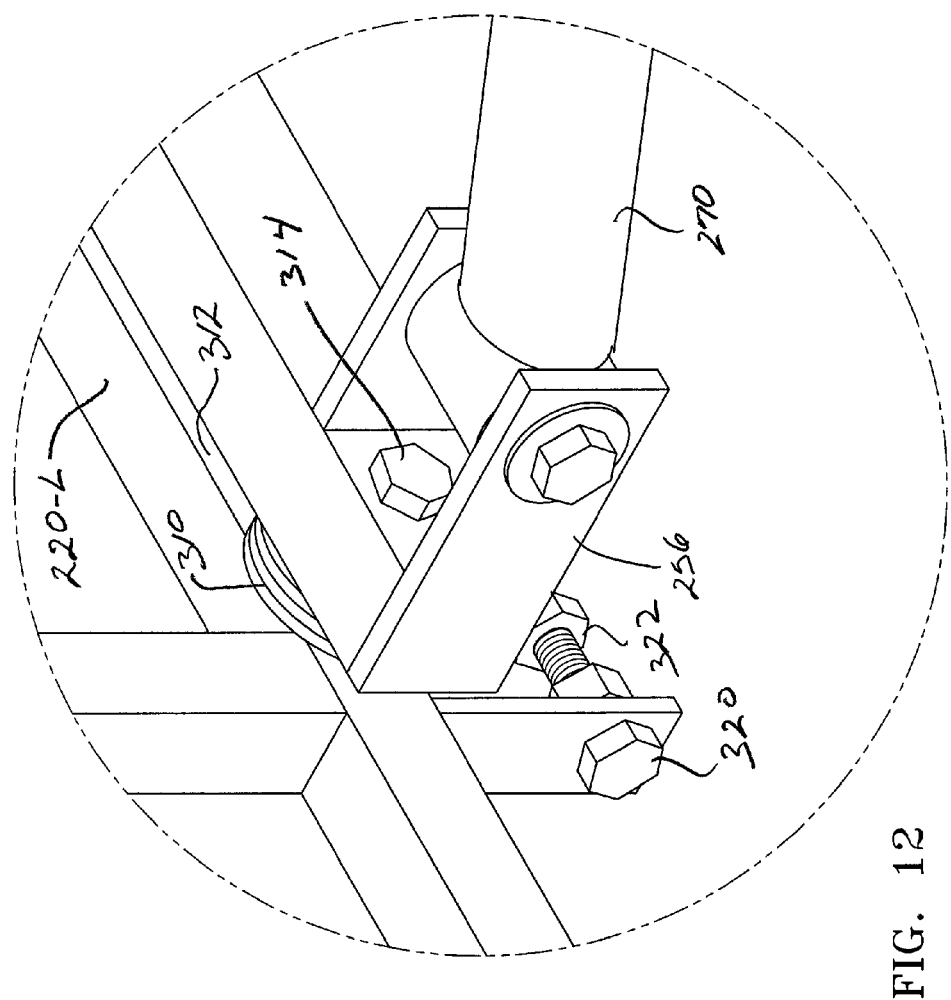
FIG. 12 is an enlarged perspective view of the circled portion of FIG. 4 showing an embodiment which provides camber and caster adjustment of the front wheels.

Referring to FIG. 12, which is an enlarged perspective view of the circled portion of FIG. 4, showing an embodiment for adjusting the camber and caster of the front wheels 260, 262. To adjust the camber, spacers 310 (such as washers) may be added or removed between the space 312 between the lower frame member 220-L and the A-arm 270. The spacers 310 are retained within the space 312 by a nut and bolt connection 314. For caster adjustment, a slotted hole 316 is provided in the lower frame member 220-L (see FIG. 5). Additionally, a threaded caster adjusting bolt 320 is secured to the underside of the lower frame member 220-L and is retained at its other end by a nut 322 secured to the A-arm. Thus, by loosening the bolt 314 and rotating the threaded caster adjustment bolt 320, the A-arm will move fore and aft with respect to the lower frame member 220-L along the slotted hole 316. Once the desired caster adjustment is made, the bolt 314 is tightened to secure the A-arm at the desired position.

It should be appreciated that the modular design of the various embodiments of the conversion kit 200 enables the reverse trike 100 to be easily converted back to the original two-wheeled motorcycle, by simply detaching the steering shaft 290 from the triple-tree 32, removing the short tubes 202 from the triple-tree 32 (if previously installed), unmounting the frame assembly 210 from the forward end of the motorcycle 10, and reattaching the front fork tubes 34, 36 to the triple tree 32 along with the front wheel 12, and reattaching the brake lines.

The foregoing descriptions of specific embodiments of the present invention have been presented for purposes of illustration and description. They are not intended to be exhaustive or to limit the invention to the particular forms disclosed, and those of skill in the art would readily appreciate that many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A method for converting a two-wheeled motorcycle to a three-wheeled reverse trike, the two-wheeled motorcycle having a single front wheel and a single rear wheel, the single front wheel supported by front fork tubes attached to a triple-tree, the triple-tree pivotally supported from a frame of the motorcycle by a head tube, the triple-tree having handle bars rigidly secured to the triple-tree such that turning of the handle bars causes the triple-tree to pivot with respect to the head tube, the method comprising:

removing the front fork tubes, including the front wheel, from the triple-tree of the motorcycle;
mounting a frame assembly to a forward end of the motorcycle;
mounting a left front wheel suspension system to a left side of the frame assembly;
mounting a right front wheel suspension system to a right side of the frame assembly;
pivotally mounting a left front wheel hub of a left front wheel to the left front wheel suspension system;
pivotally mounting a right front wheel hub of a right front wheel to the right front wheel suspension system;
rigidly securing an upper end of a steering shaft to the triple-tree of the motorcycle, the steering shaft having a longitudinal axis;
pivotally supporting the steering shaft by the head tube such that the steering shaft together with the triple-tree pivot about the longitudinal axis with respect to the head tube;
linking one end of a left steering tie rod to a lower end of the steering shaft and linking another end of the left steering tie rod to a left wheel spindle of the left front wheel suspension system;
linking one end of a right steering tie rod to the lower end of the steering shaft and linking another end of the right steering tie rod to a right wheel spindle of the right front wheel suspension system;
whereby turning of the handle bars causes the steering shaft together with the triple-tree to pivot about the longitudinal axis with respect to the head tube and causes the left and right steering tie rods to effect corresponding turning of the left and right front wheels.

2. The method of claim 1 wherein the method includes converting the reverse trike back to a two-wheeled motorcycle, the method further comprising:

detaching the steering shaft from the triple tree;
unmounting the frame assembly from the forward end of the motorcycle;
reattaching the front fork tubes, including the front wheel, to the triple-tree of the motorcycle.

3. The method of claim 1 wherein the frame assembly comprises a forward frame assembly and an adaptor cradle.

4. The method of claim 3 wherein the forward frame assembly is capable of use with substantially any motorcycle for converting the motorcycle to a reverse trike.

5. The method of claim 4 wherein the rearward end of the adaptor cradle is configured to mount to particular makes and models of motorcycles and the forward end of the adaptor cradle is adapted to mount to the forward frame assembly.

6. The method of claim 5 wherein the rearward end of the adaptor cradle includes motorcycle mounts adapted to mount to particular makes and models of motorcycles.

7. The method of claim 6 wherein the motorcycle mounts include saddle brackets positioned and sized to receive forward struts of the motorcycle frame.

8. The method of claim 6 wherein the motorcycle mounts include brackets positioned and adapted to secure to mounting locations on the motorcycle.

9. The method of claim 1 wherein each of the left and right wheel suspension systems includes at least one control arm secured to the wheel spindle and pivotally attached to the frame assembly.

10. The method of claim 1 further comprising:
attaching body panels to the frame assembly.

11. The method of claim 1 further comprising:
mounting a left front wheel shock to a shock mounting bracket on the frame assembly and to the left front wheel hub; and
mounting a right front wheel shock to a shock mounting bracket on the frame assembly and to the right front wheel hub.

12. The method of claim 1 further comprising:
attaching short tubes to the triple-tree where the removed front fork tubes had been attached.

13. A kit for converting a two-wheeled motorcycle to a three-wheeled reverse trike, the two-wheeled motorcycle having a single front wheel and a single rear wheel, the single front wheel supported by front fork tubes attached to a triple-tree, the triple-tree pivotally supported from a frame of the motorcycle by a head tube, the triple-tree having handle bars rigidly secured to the triple tree such that turning of the handle bars causes the triple-tree to pivot with respect to the head tube, the kit comprising:

a frame assembly adapted to mount to a forward end of the motorcycle;
a left front wheel suspension system adapted to mount to a left side of the frame assembly;
a right front wheel suspension system adapted to mount to a right side of the frame assembly;
a left front wheel supported by the left front wheel suspension system;
a right front wheel supported by the right front wheel suspension system;
a steering shaft having a longitudinal axis, the steering shaft adapted to be rigidly attached at an upper end to the triple-tree of the motorcycle and pivotally received within the head tube such that the steering shaft together with the triple-tree is pivotable about the longitudinal axis with respect to the head tube;

a left steering tie rod linkable at one end to a lower end of the steering shaft and linkable at its other end to a left wheel spindle of the left front wheel suspension system; and a right steering tie rod linkable at one end to the lower end of the steering shaft and linkable at its other end to a right wheel spindle of the right front wheel suspension system;

whereby, when the motorcycle is converted to a three-wheeled reverse trike using the kit, turning of the handle bars causes the steering shaft together with the triple-tree to pivot about the longitudinal axis with respect to the head tube and causes the left and right steering tie rods to effect corresponding turning of the left and right front wheels.

14. The kit of claim 13, wherein the frame assembly comprises a forward frame assembly and an adaptor cradle.

15. The kit of claim 14, wherein the forward frame assembly is capable of use with substantially any motorcycle for converting the motorcycle to a reverse trike.

16. The kit of claim 15, wherein the rearward end of the adaptor cradle is configured to mount to particular makes and models of motorcycles and the forward end of the adaptor cradle is adapted to mount to the forward frame assembly.

17. The kit of claim 16, wherein the rearward end of the adaptor cradle includes motorcycle mounts adapted to mount to particular makes and models of motorcycles.

18. The kit of claim 17, wherein the motorcycle mounts include saddle brackets positioned and sized to receive forward struts of the motorcycle frame.

19. The kit of claim 17, wherein the motorcycle mounts include brackets positioned and adapted to secure to mounting locations on the motorcycle.

20. The kit of claim 13, further comprising:
body panels attachable to the frame assembly.

21. The kit of claim 13, further comprising:
shocks adapted to mount to mounting brackets on the frame assembly and to the left and right front wheel hubs.

22. The kit of claim 13, further comprising:
short tubes adapted to attach to the triple-tree in place of the front fork tubes.

* * * * *